United States Patent [19]

Iacobucci et al.

[11] 4,285,982

[45] Aug. 25, 1981

[54] PROCESS FOR ENHANCING THE SUNLIGHT STABILITY OF ANTHOCYANIC PIGMENTS

[75] Inventors: Guillermo A. Iacobucci; James G. Sweeny, both of Atlanta, Ga.

[73] Assignee: The Coca-Cola Company, Atlanta, Ga.

[21] Appl. No.: 128,463

[22] Filed: Mar. 10, 1980

Related U.S. Application Data

[63] Continuation of Ser. No. 70,971, Aug. 30, 1979, abandoned.

[51] Int. Cl.$^3$ .............................................. A23L 1/272
[52] U.S. Cl. ...................................... 426/250; 426/540
[58] Field of Search ................................. 426/250, 540

[56] References Cited

PUBLICATIONS

Opening Bulletin to the Public of the Patent Application, Japan Patent Office, Showa 50 (1975)-36548.
Opening Bulletin to the Public of the Patent Application, Japan Patent Office, Showa 50 (1975)-68421.
Broulliard et al., J. Am. Chem. Soc., 99,1359, 99,8461, 1977.
Robinson et al., Brochem. J., 25, 1687, 1931.
Asen, et al., Phytochem., 11, 1139, 1972.
Scheffeldt, et al., J. Food Sci., 43, 517, 1978.
Krewson, et al., J. Am. Pharm. Asscn., 41, 582, 1952.
Yamaguchi, Nippon Kagaku Zasshi, 81, 1332, 1960 (Chem. Abs. 56, 445).

*Primary Examiner*—Jeanette M. Hunter
*Attorney, Agent, or Firm*—John R. Martin

[57] ABSTRACT

The sunlight stability of anthocyanic pigments in mixtures, especially foods, may be enhanced by including in the mixture a photoprotective agent selected from the group consisting of sulfonated polyhydroxyflavonols, poly(hydroxyalkyl) flavonols, sulfonated polyhydroxyflavones, sulfonated polyhydroxyiso-flavones, and sulfonated aurones.

27 Claims, No Drawings

PROCESS FOR ENHANCING THE SUNLIGHT STABILITY OF ANTHOCYANIC PIGMENTS

This is a continuation of application Ser. No. 70,971 filed Aug. 30, 1979 now abandoned.

BACKGROUND OF THE INVENTION

The present invention relates generally to mixtures containing anthocyanic pigments and particularly to a process for stabilizing the anthocyanic pigments in such mixtures to sunlight-induced bleaching. The invention also relates to a novel photostable colorant composition produced by such process as well as to a novel food product containing such colorant composition.

Anthocyanic pigments, i.e. anthocyanins and anthocyanidins, have been found to account for the natural colors of many fruits, vegetables and flowers. Despite their widespread occurrence in nature, however, these pigments have not been widely used as colorants in foods because of both limited availability and, in many cases, poor stability and resultant color loss.

The instability of anthocyanins in food systems has been studied extensively [Markakis, Food Technology, 4, 437(1974); Hrazdina, Labersmith-Wiss. U. Technol., 7, 193 (1974)]. Anthocyanic pigments appear to be unstable in aqueous solutions at pH's above 4, at high temperature or in the presence of $H_2O_2$ or ascorbic acid. In addition, although anthocyanic pigments are stable under normal laboratory lighting conditions, direct exposure to sunlight causes extensive degradation and resultant color loss. [Van Buren, et al., Am J. Enol. & Vitic., 19, 147 (1968)].

Obviously, a process for stabilizing anthocyanic pigments in food products would greatly expand the potential utility of such pigments especially in products which cannot be constantly maintained at low temperatures in the dark. Nevertheless, such a process has not been developed, perhpas due to a lack of understanding of the mechanism of photodegradation. Only the mechanism involved in decoloration by increasing pH appears to have been determined. [Brouillard and Dubois, J. Am. Chem. Soc., 99, 1359(1977); Brouillard and Delaportes, J. Am. Chem. Soc., 99, 8461(1977)].

It has long been known [Robinson and Robinson, Biochem. J., 25, 1687(1931)] that the various red to blue shades of flowers are due to anthocyanins either alone or in association with phenolic materials, called "co-pigments", which are present in the plants along with the anthocyanins. These co-pigments are known to cause a bathochromic shift in the $\lambda_{max}$ of the anthocyanin pigment and also an increase in the absorbance at $\lambda_{max}$. Several phenolic compounds have been shown to give this "co-pigment effect" in model systems. [Asen, et al., Phytochem., 11, 1139(1972); Scheffeldt and Hrazdina, J. Food Sci., 43, 517(1978)]. This co-pigment effect appears to be at its greatest when the co-pigment is a flavonol, and the use of flavonol co-pigments, such as rutin and kaempferol-3-glucoside, has been suggested as a way to enhance the hue and intensity of anthocyanin colorants in foods [see Scheffeldt and Hrazdina, above]. The use of non-flavanoid compounds as co-pigments, however, does not appear to have been shown or suggested previously.

In order to determine the "co-pigment effect" of various compounds, both naturally occurring and synthetic, a 10 ppm solution of the representative anthocyanin, cyanidin rutinoside, in 0.01 M citric acid was combined with the compounds, and in the amounts, shown in Table I.

Both the $\lambda_{max}$ and the absorbance at $\lambda_{max}$ were measured for each mixture using a Beckman Model 25 UV-Visible spectrophotometer and quartz cells. Absorbance readings were normalized according to the formula: Abs=[Abs w/copigment]/[Abs w.o. co-pigment].

| | Effect of Various Co-pigments on the $\lambda_{max}$(nm) and Absorbance* of a 10 ppm Solution of Cyanidin Rutinoside in 0.01 M Citric Acid. | | | | | | |
|---|---|---|---|---|---|---|---|
| | co-pigment | 0 ppm | 20 ppm | 50 ppm | 100 ppm | 200 ppm | 500 ppm | 1000 ppm |
| 1. | rutin | 512 (1.0) | 512 (1.15) | 513 (1.16) | 513 (1.18) | 514 (1.22) | 518 (1.26) | 523 (1.32) |
| 2. | hydroxyethyl rutin | 512 (1.0) | 513 (1.01) | 514 (1.02) | 516 (1.04) | 518 (1.05) | 523 (1.08) | 528 (1.10) |
| 3. | kaempferol-3-glucoside | 512 (1.0) | 513 (1.01) | 514 (1.01) | 516 (1.04) | 521 (1.06) | 528 (1.08) | 533 (1.10) |
| 4. | quercetin 0-sulfates | 512 (1.0) | 513 (1.01) | 514 (1.03) | 516 (1.06) | 520 (1.10) | 526 (1.17) | 530 (1.23) |
| 5. | 4-methyl-umbelliferone sulfate | 512 (1.0) | 512 (1.01) | 512 (1.02) | 512 (1.02) | 513 (1.05) | 516 (1.12) | 519 (1.20) |
| 6. | quercetin-5'-sulfonate | 512 (1.0) | 517 (1.05) | 525 (1.07) | 532 (1.08) | 535 (1.08) | 544 (1.08) | 550 (1.08) |
| 7. | quercetin-5' 8- & 5', 6-disulfonate | 512 (1.0) | 517 (1.07) | 525 (1.12) | 530 (1.16) | 536 (1.19) | 540 (1.19) | 544 (1.20) |
| 8. | flavone mono-sulfonate | 512 (1.0) | 514 (1.02) | 517 (1.05) | 519 (1.10) | 522 (1.16) | 528 (1.27) | 535 (1.33) |
| 9. | flavone disulfonate | 512 (1.0) | 512 (0.99) | 512 (0.99) | 514 (0.99) | 515 (0.98) | 517 (0.96) | 520 (0.91) |
| 10. | 4'-methoxy-aurone mono- & disulfonates | 512 (1.0) | 514 (1.01) | 517 (1.03) | 524 (1.06) | 530 (1.10) | 538 (1.10) | 544 (1.09) |
| 11. | flavonol mono- & disulfonates | 512 (1.0) | 513 (1.01) | 514 (1.02) | 516 (1.04) | 518 (1.08) | 522 (1.16) | 527 (1.23) |
| 12. | morin disulfonate | 512 (1.0) | 512 (1.04) | 514 (1.08) | 516 (1.14) | 518 (1.23) | 523 (1.35) | 527 (1.43) |
| 13. | xanthone mono- & di-sulfonates | 512 (1.0) | 512 (1.02) | 512 (1.02) | 514 (1.05) | 517 (1.11) | 522 (1.20) | 529 (1.26) |

-continued

Effect of Various Co-pigments on the $\lambda_{max}$(nm) and Absorbance* of a 10 ppm Solution of Cyanidin Rutinoside in 0.01 M Citric Acid.

| | co-pigment | 0 ppm | 20 ppm | 50 ppm | 100 ppm | 200 ppm | 500 ppm | 1000 ppm |
|---|---|---|---|---|---|---|---|---|
| 14. | N-methyl acridone mono- & di-sulfonates | 512 (1.0) | 513 (1.04) | 515 (1.09) | 519 (1.15) | 522 (1.21) | 527 (1.28) | 531 (1.28) |
| 15. | biochanin A sulfonate | 512 (1.0) | 513 (1.02) | 514 (1.04) | 516 (1.07) | 519 (1.10) | 524 (1.14) | 527 (1.11) |
| 16. | Anthraquinone mono- & di-sulfonates | 512 (1.0) | 512 (1.0) | 513 (1.02) | 514 (1.05) | 516 (1.10) | 521 (1.20) | 527 (1.31) |
| 17. | Apigenin mono- and di-sulfonates | 512 (1.0) | 517 (1.06) | 525 (1.13) | 531 (1.18) | 536 (1.23) | 542 (1.26) | 546 (1.33) |
| 18. | 4'-methoxy-flavone sulfonate | 512 (1.0) | 515 (1.03) | 518 (1.06) | 522 (1.11) | 528 (1.17) | 536 (1.23) | 543 (1.26) |

*absorbance expressed as [Abs. with co-pigment]/[Abs. without co-pigment].

In addition to the co-pigments shown in Table I, 1000 ppm concentrations of the following compounds were tested as in Table I and found to exert no spectral shift greater than 5 nm on 10 ppm solutions of cyanidin rutinoside: Chromone sulfonate, Catechin sulfonate, Dihydroquercetin sulfonate, Bis-(p-methoxy-benzoyl) methane sulfonate, 4-Hydroxycoumarin sulfonate, 7-Hydroxycoumarin sulfonate, Resorcinol sulfonate, p-Toluene sulfonic acid, Sulfosalicylic acid, Gallic acid, 4,4'-Dimethoxychalcone sulfonate, N-methylquinolone sulfonate.

Few, if any, naturally occurring flavonols are attractive for co-pigmentation studies because of their limited availability and/or limited water solubility. The most abundant flavonol, rutin (quercetin-3-rutinoside) (1), shows very poor solubility in water [130 ppm at room temperature-Krewson and Naghski, J. Am. Pharm. Assoc., 41, 582(1952)]. More soluble flavonols such as kaempferol-3-glucoside (3) are not available in sufficient quantities to meet commercial scale needs.

Conversion of rutin to a water soluble derivative has been achieved previously by reaction with 2-chloroethanol and NaOH to give mainly the tri-hydroxyethyl derivative, mixed with some di- and tetra-hydroxyethyl ethers. This mixture is generally known as hydroxyethylrutin (HER)(2). A sample of HER prepared by the Zyma procedure [British Patent No. 1,045,010] showed an effect very similar to that of rutin itself (Table I).

Quercetin, the aglycone of rutin, shows no co-pigmentation effect, presumably due to its extremely low solubility. Although hydroxyethylated quercetin has not been prepared, various sulfate esters have been. Quercetin-O-sulfates, i.e. a complex mixture of mono-, di-, tri-, and tetrasulfate esters (4) prepared from quercetin and sulfamic acid by the method of Yamaguchi [Nippon Kagaku Zasshi, 81, 1332(1960); Chem. Abs., 56, 445], show a distinct co-pigment effect (Table I).

As shown in Table I, the co-pigments which show the greatest co-pigment effect are the polyhydroxy flavonol sulfonates. Instead of esterifying the flavonol OH groups, sulfonation involves nuclear substitution of the flavone with the SO3H group. Quercetin-5'-sulfonate (6) shows a co-pigmentation effect with cyanidin rutinoside at concentrations approximately 1/10 that at which rutin or HER show equivalent effects. This superiority for the quercetin-5'-sulfonate can best be seen by comparing the data for each co-pigment at the 100 ppm level. (Table I)

Quercetin-5'-sulfonate has been described many times previously, primarily as a reagent for spectrophotometric analysis of zirconium, hafnium, uranium and other elements. It has also been suggested as an ingredient in suntan lotion. For many years it was thought to be the 8-isomer, however, the correct 5' sulfonate structure was recently determined by NMR [Terpilowski, et al., Diss. Pharm. Pharmacol., 1970 (22), 389-93].

Although not quite as effective as quercetin-5'-sulfonate, quercetin-5',8-disulfonate (7) (which is prepared, along with some 5',6 disulfonate, as a by-product in the preparation of monosulfonate and isolated by prep HPLC) shows good co-pigment properties.

Each of these sulfonates, as well as others disclosed herein, are prepared by dissolving the parent compounds in a 50/50 mixture of conc. sulfuric acid and fuming sulfuric acid and allowing the mixture to stand at room temperature for approximately five minutes. The mixture is then poured into excess ice water and the solution neutralized with solid CaCO3. The resulting CaSO4 is removed by filtration and the filtrate passed through a strong cation exchange resin in the Na+ form to remove excess Ca++ ions. The eluent is then freeze-dried to yield the 40–60% pure sulfonate.

As shown by the data in Table I, several compounds in addition to flavanoids can function as co-pigments to enhance the color of foods containing anthocyanin pigments. It does not appear, however, that anyone has shown or suggested a solution to the more critical problem associated with anthocyaninc pigments, i.e., how to reduce or eliminate the tendency of these pigments to fade when exposed to sunlight.

SUMMARY

It has now been discovered that the tendency of anthocyanic pigments to fade when foods containing them are exposed to sunlight may be substantially reduced by including in the food a colorant composition consisting essentially of the anthocyanic pigment and a photoprotective agent selected from the group consisting of sulfonated polyhydroxyflavonols, poly(hydroxyalkyl)-flavonols, sulfonated polyhydroxy flavones, sulfonated polyhydroxyiso-flavones and sulfonated aurones.

DETAILED DESCRIPTION OF THE INVENTION

A complete understanding of the present invention, including its best mode of operation, will be gained by those skilled in the art from the following description and examples.

EXAMPLE I

In order to test whether the color of anthocyanin-containing food products may be stabilized with respect to sunlight-induced fading through the use of a photoprotective agent, several experimental beverages were prepared containing 30 ppm of the representative anthocyanin cyanidin rutinoside (the main pigment in cherries) and 850 ppm (40 molar excess) of kaempferol-3-glucoside (3). Beverages containing 30 ppm cyanidin rutinoside and no photoprotective agent were used as controls.

The experimental beverages were prepared from a syrup containing 2.0 kg water, 25 g citric acid, 2.5 kg sugar, and 40 g of commercial grape flavor. The syrup was diluted 4.4:1 with water, the colorant and co-pigment added, and the resulting beverage carbonated with two volumes of carbon dioxide. Standard flint glass bottles were used as containers. Sunlight exposure was measured with a broad spectrum Langley meter, with samples being removed periodically for analysis. Cyanidin rutinoside was determined by high pressure liquid chromatography using a Waters LC equipped with a Hewlett-Packard peak integrator and a $C_{18}$ micro Bondapak column. An eluent consisting of MeOH (15%), HOAc (5%) and water (80%) was used at a flow rate of 2.0 ml/min. All samples were pasteurized for 15 minutes before starting the experiment. These beverages, both with and without photoprotective agent, were exposed to the conditions, and showed the effects, reported in Table II.

TABLE II

| EXPERIMENTAL CONDITIONS | CYANIDIN RUTINOSIDE* (30 p.p.m.) | CYANIDIN RUTINOSIDE* (30 p.p.m.) + KAEMPFEROL-3-GLUCOSIDE (850 p.p.m.) |
|---|---|---|
| R.T. Sunlight | | |
| 0 Time | 100% | 100 |
| 565 Langleys | 74 | 85 |
| 1162 Langleys | 41 | — |
| 1600 Langleys | 28 | 78 |
| 2000 Langleys | 19 | 75 |
| 5000 Langleys | 0 | 42 |
| RT., Dark | | |
| 4 weeks | 88 | 92 |
| 8 weeks | 74 | 86 |
| 100° F., Dark | | |
| 2 weeks | 99 | 98 |
| 4 weeks | 77 | 79 |
| 8 weeks | 55 | 69 |

*Results expressed as % of Pigment Remaining according to the formula ([Anthocyanin]$_t$/[Anthocyanin]$_{t=o}$) × 100%.

From the results shown in Table II it is obvious that the use of the natural flavonol kaempferol-3-glucoside greatly enhances the resistance of cyanidin rutinoside to sunlight-induced fading. A slight enhancement of stability under ambient conditions is also observed.

In order to determine whether the synthetic flavone sulfonate quercetin-5'-sulfonate (6) would exhibit a photoprotective effect similar to that found for the natural flavonol kaempferol-3-glucoside, Example II was performed.

EXAMPLE II

Model beverages were prepared as described in Example I with the concentrations of anthocyanin and photoprotective agent as shown in Table III. Cyanidin rutinoside was determined by high pressure liquid chromatography using a Waters LC equipped with an HP peak integrator and a $C_{18}$ micro Bondapak column, and an eluent consisting of MeOH (15%), HOAc (5%), and water (80%). Eluent flow rate was 2.0 ml/min.

Enocianina (a grape skin colorant containing approximately 3% anthocyanin pigment) was analyzed by reading the absorbance value at the $\lambda_{max}$. All samples were pasteurized for 15 minutes at 80° before starting the experiment. The results are set forth in Table III.

TABLE III

Sunlight Fading[1] of Anthocyanins in a Beverage Matrix at pH 3.0

| Langleys[2] | 20 ppm Cyanidin Rutinoside | 20 ppm Cyanidin Rutinoside + 100 ppm Quercetin-5'-Sulfonate | 375 ppm Enocianina | 375 ppm Enocianina + 100 ppm Quercetin-5'-Sulfonate |
|---|---|---|---|---|
| 0 | 100 | 100 | 100 | 100 |
| 507 | | | 80 | 92 |
| 517 | 65 | 86 | | |
| 1012 | 48 | 74 | | |
| 1344 | | | 63 | 83 |
| 2005 | 38 | 70 | | |
| 2104 | | | 52 | 78 |
| 2901 | | | 42 | 73 |
| 3104 | 12 | 63 | | |
| 5010 | 0 | 47 | | |
| 5047 | | | 29 | 62 |

[1]Results expressed as % color remaining from 0 time. Values determined by absorbance at 520 nm.

% Color Remaining = $\frac{Abs_t}{Abs_{t=o}}$ × 100%

[2]Expressed as Cal/cm$^2$

Table III shows that quercetin-5'-sulfonate acts as a photoprotective agent for the representative anthocyanins cyanidin rutinoside and enocianina. Although used at a much lower concentration, the photoprotective effect of quercetin-5'-sulfonate is approximately the same as that of the natural flavonol, kaempferol-3-glucoside (Example I).

Since quercetin-5'-sulfonate exhibits a co-pigment effect as well as a photoprotective effect, and since, as shown in Table I, several heterocyclic sulfonates show good co-pigment effects, Example III was performed to test whether certain of the species from Table I would inhibit sunlight fading of anthocyanin pigments.

EXAMPLE III

The sulfonated heterocycles listed in Table IV were prepared as described above.

The amount of each compound shown in Table IV was adjusted based on its purity so that each sample contained 500 ppm of pure sulfonate unless otherwise indicated. All solutions contained 20 ppm cyanidin rutinoside and 200 ppm sodium benzoate in 0.01 M citric acid. Samples were removed periodically, and the absorbance determined at the $\lambda_{max}$. Values represent percent color remaining. Table IV shows the results of this experiment.

Effect of Added Co-pigments on the Sunlight Fading of Cyanidin Rutinoside.

| λmax | Additive | Langleys (Cal/cm$^2$) | | | | | | | |
|---|---|---|---|---|---|---|---|---|---|
| | | 0 | 46 | 103 | 193 | 298 | 666 | 1186 | 1631 |
| 512 | none | 100 | — | — | 90 | — | 63 | 36 | 19 |
| 535 | quercetin-5'-sulfonate* | 100 | — | — | 98 | — | 92 | 86 | 83 |
| 525 | morin di-sulfonate | 100 | — | — | 98 | — | 92 | 86 | 83 |
| 540 | 4'-methoxy aurone mono- & di-sulfonate | 100 | — | — | 94 | — | 80 | 65 | 56 |
| 525 | xanthone mono- & di-sulfonate | 100 | 14 | 1 | — | — | — | — | — |
| 530 | N-methyl acridone mono- & di-sulfonate | 100 | 13 | 1 | — | — | — | — | — |
| 517 | 4-methyl quinolone mono- & di-sulfonate | 100 | — | 8 | — | — | — | — | — |
| 517 | 4-methyl umbelliferone sulfate | 100 | — | 73 | 48 | 21 | 1 | — | — |
| 525 | anthroquinone mono- & di-sulfonate | 100 | — | 43 | 11 | — | — | — | — |
| 527 | biochanin A sulfonate | 100 | — | — | 97 | — | 81 | 67 | 59 |

| λmax | Additive | Langleys (Cal/cm$^2$) | | | | | |
|---|---|---|---|---|---|---|---|
| | | 0 | 171 | 466 | 993 | 1275 | 1633 |
| 512 | none | 100 | 88 | 75 | 41 | 23 | 9 |
| 533 | quercetin disulfonate* | 100 | 98 | 96 | 88 | 86 | 80 |
| 533 | flavone monosulfonates | 100 | 19 | 1 | — | — | — |
| 530 | flavone di-sulfonates | 100 | 1 | — | — | — | — |
| 515 | catechin | 100 | 89 | 79 | 42 | 24 | 10 |
| 515 | gallic acid | 100 | 90 | 72 | 8 | — | — |
| 530 | hydroxyethyl rutin | 100 | 95 | 91 | 79 | 71 | 64 |
| 530 | quercetin-O-sulfates | 100 | 94 | 86 | 67 | 55 | 47 |
| 515 | dihydro-quercetin | 100 | 97 | 86 | 50 | 29 | 15 |

| λmax | Additive | LANGLEYS (CAL/cm$^2$) | | | | | |
|---|---|---|---|---|---|---|---|
| | | 0 | 212 | 533 | 754 | 1168 | 1629 |
| 512 | none | 100 | 82 | 58 | 46 | 24 | 10 |
| 535 | 4'-methoxy flavone sulfonate | 100 | 10 | — | — | — | — |
| 532 | apigenin sulfonates* | 100 | 89 | 78 | 74 | 63 | 51 |
| 525 | flavonol sulfonates | 100 | 1 | — | — | — | — |

*100 ppm

The results shown in Table IV demonstrate that only certain of the compounds which exhibit a co-pigment effect (see Table I) also exhibit a photoprotective effect and that, in fact, several of the compounds exhibiting co-pigment effects enhanced rather than reduced the photodegradation of cyanidin rutinoside. Those co-pigment species showing promising photoprotective effects are hydroxyethylrutin (2) [a poly(hydroxyalkyl)-flavonol], quercetin disulfonate (7), quercetin-5'-sulfonate (6) and morin disulfonate (12) [polyhydroxyflavonol sulfonates], biochanin A sulfonate (15) [a polyhydroxyiso-flavone sulfonate], 4'-methoxyaurone sulfonate and 4'-methoxyaurone disulfonate (10) [aurone sulfonates], and apigenin sulfonates (17) [polyhydroxy flavone sulfonates]. Among the remaining co-pigments tested in Example III, quercetin-O-sulfates (4) exhibited a somewhat lower degree of photoprotective effect, and certain other co-pigments including flavone mono-sulfonate (8), flavone disulfonate (9) and 4'-methoxyflavone sulfonate (18), actually increased the rate of photodecomposition of cyanidin rutinoside.

As used in the generic terms given above, the term "polyhydroxy" is defined to mean at least two and not more than five hydroxyl substituents on the aromatic rings of the individual species. Also, as used above, the term "poly(hydroxyalkyl)" is defined to mean not less than two nor more than four hydroxyethyl or hydroxypropyl substituents on the aromatic rings of the individual species.

The results of Example III indicate several suprising aspects of the interaction between anthocyanin pigments and co-pigments. Foremost among these is the finding that all co-pigments are not necessarily photoprotective agents, and, in fact, sometimes enhance photodegradation. The second aspect shown by Example III is that the mere presence of a sulfonate group in a co-pigment does not necessarily indicate that the sulfonated co-pigment will be a photoprotective agent. Thus, the polyhydroxyflavonol sulfonate, quercetin-5'-sulfonate (6), and the non-sulfonated poly(hydroxyalkyl) flavonol, hydroxyethylrutin (2), are each both a co-pigment and a photoprotective agent, whereas both flavone mono- (8) and di-sulfonate (9) are co-pigments but actually promote photodecomposition. Thus the mere presence of a sulfonate group in a co-pigment does not appear to insure photoprotective capability in a co-pigment. Third, and finally, although certain of the co-pigments which show photoprotective capabilities are antioxidants, i.e. quercetin-5'-sulfonate (6), other species which are also anti-oxidants either show no photoprotective effect (catechin and dihydroquercetin) or actually increase the rate of photodegradation (gallic acid).

From the foregoing discussion of the results shown in Table IV, it is apparent that, among those generic classes tested, sulfonated polyhydroxyflavonols, poly(hydroxyalkyl)flavonols, sulfonated polyhydroxyflavones, sulfonated polyhydroxyiso-flavones, and sulfonated aurones will act as both co-pigments and photoprotective agents.

In order to ensure that the photoprotective effect, like the co-pigment effect, actually results from a molecular interaction and is not merely a "screening effect", i.e. where the co-pigment absorbes that portion of sunlight which causes photodecomposition, Example IV was performed.

EXAMPLE IV

Three separate test mixtures were prepared in 0.01 M citric acid solution containing 200 ppm sodium benzoate as preservative. Mixture A contained 20 ppm cyanidin rutinoside, Mixture B contained 20 ppm cyanidin rutinoside and 100 ppm quercetin-5'-sulfonate (Q.S.), and Mixture C contained 15 ppm quercetin-5'-sulfonate only.

Mixture A and B were placed in 30 ml test tubes which were suspended in 250 ml wide mouth Erlenmeyer flasks containing 210 ml. of water. A second sample of mixture A was placed in a 30 ml. test tube and suspended in a 250 ml. wide-mouth flask containing 210 ml. of Mixture C. The three resulting samples are referred to as (1) cyanidin rutinoside control, (2) cyanidin rutinoside+quercetin-5'-sulfonate (Q.S.) internal and (3) cyanidin rutinoside+quercetin-5'-sulfonate (Q.S.) external. The total quantity of quercetin-5'-sulfonate used was the same in samples two and three.

The flasks containing the test tubes were then exposed to sunlight and samples removed periodically for analysis at the $\lambda_{max}$. The results are presented in Table V as percent color remaining defined as $Abs_t/Abs_{t=o} \times 100\%$.

TABLE V

| Langleys | Cyanidin Rutinoside control | Cyanidin Rutinoside + Q.S. Interal | Cyanidin Rutinoside + Q.S. External |
|---|---|---|---|
| 0 | 100 | 100 | 100 |
| 207 | 84 | 95 | 88 |
| 376 | 65 | 92 | 76 |
| 589 | 38 | 83 | 56 |
| 910 | 18 | 72 | 36 |
| 1128 | 9 | 67 | 26 |

The results shown in Table V demonstrate that the photoprotective effect of quercetin-5'-sulfonate toward cyanidin rutinoside is not merely a "screening effect", and tend to prove that the photoprotective effect demonstrated in Table IV is dependent on a molecular interaction between photoprotective agent and anthocyanin colorant.

This interaction is particularly strong in the case of the yellow 3-deoxyanthocyanidins such as apigeninidin chloride. In fact, when a solution of 10 ppm apigeninidin chloride and 100 ppm quercetin-5'-sulfonate in 0.01 M citric acid is allowed to stand overnight at room temperature, a portion of the colorant and the co-pigment begins to precipitate as a 1:1 complex. Despite the precipitate formation, a significant amount of the anthocyanidin pigment color remains in solution along with a significant amount of the 5'-sulfonate.

In instances such as this, the solubility limits will be such as to restrict the molar excess of photoprotective agent over pigment which can be used, although sufficient photoprotective agent may still be used to provide an adequate level of photoprotection. In extreme instances, the solubility limits may be so low as to allow insufficient concentrations of pigment and photoprotective agents to be used. In these instances the invention will be nonetheless operative, but achieving optimum levels of color may require the addition of an additional solvent, such as alcohol or a polyol, to the aqueous solution, in order to increase the solubility of the complex.

The photoprotective effect of (the uncharged) hydroxyethylrutin on the representative 3-deoxyanthocyanidin apigeninidin chloride is shown in Example V.

EXAMPLE V

Samples were prepared in 0.01 M citric acid containing 200 ppm sodium benzoate as preservative. Apigeninidin chloride was used at 20 ppm and hydroxyethylrutin at 100 ppm. Samples were stored in 100 ml. volumetric flasks and exposed to direct sunlight. Aliquots were removed periodically and the absorbance measured at the $\lambda_{max}$.

The results are summarized in Table VI, values of percent color remaining determined as $[Abs_t/Abs_{t=o}] \times 100\%$.

TABLE VI

| Sample | LANGLEYS | | | | | |
|---|---|---|---|---|---|---|
|  | 0 | 774 | 1317 | 2374 | 3365 | 4341 |
| Apigeninidin Chloride | 100 | 100 | 96 | 75 | 46 | 20 |
| Apigeninidin + Hydroxyethylrutin | 100 | 100 | 100 | 97 | 92 | 86 |

From the foregoing disclosure, those skilled in the art will appreciate that a photostable colorant composition suitable for use in mixtures, especially foods, may be produced by combining one or more anthocyanic pigments, i.e. anthocyanins or anthocyanidins, with one or more photoprotective agents. Such a photostable colorant composition, as shown by Example IV, above, is more than a mere aggregation of individual species. Such a composition exhibits enhanced photostability greater than that which would be produced if the anthocyanin and the photoprotective agent had no molecular interaction, i.e. if the photostability resulted only due to a "screening effect". Yet the ability to separate the pigment from the photoprotective agent, i.e. by HPLC, indicates that no permanent molecular transformation in either species has been made. Thus, the present invention embraces the photostable colorant composition itself, the process for producing the photostable colorant composition, and a food product containing the photostable colorant composition.

While the majority of the Examples described above utilize approximately a 5:1 molar ratio of photoprotective agent to anthocyanic pigment, it does not appear that there is either an upper or a lower limit on the useful range of this ratio. For practical reasons, a broad range of photoprotective agent:anthocyanic pigment molar ratios of from about 1:1 to about 20:1 may be used. A ratio of from about 2:1 to about 10:1 is preferred and a ratio of about 5:1 is optimum from a cost/benefit perspective.

The novel food product of this invention may take several alternative forms. The food may be in dry form such as a beverage powder, or the like, which is adapted for dissolution in water. The food product may also be a water-based concentrate or syrup which is adapted for dilution with water to produce a single strength beverage. Finally, the food product may be a single strength beverage. In general the novel food composition of this invention will comprise an anthocyanic pigment, a photoprotective agent and a food base, i.e. a combination of all ingredients of the finished food save the anthocyanic pigment and the photoprotective agent.

As those skilled in the art will readily appreciate, the utility of the present invention resides in enabling one to produce an anthocyanic colorant composition which photodegrades at a significantly slower rate than does the anthocyanic pigment by itself. Such utility in a food product will be of little advantage if the food product contains other ingredients, or is exposed to conditions, which tend to destroy either the anthocyanic pigment or the photoprotective agent. Thus neither the colorant composition nor the food product of this invention should be exposed to elevated temperatures or pH's sufficient to degrade either the anthocyanic pigment or the photoprotective agent, nor should the food product contain ingredients, such as ascorbic acid, which tend to react with and decolorize, the anthocyanic pigment. This is not to say that such factors would necessarily interfere with, or eliminate, the photoprotective effect disclosed herein, but rather that protection from photodegradation may be futile if reactive degradation is allowed to prevail.

From the foregoing description it will be apparent that changes in the colorant composition, food product, and process, as well as the steps or order of steps in the process as described herein may occur to persons skilled in the art without departing from the scope and spirit of the invention. Accordingly, the foregoing description is considered to be only exemplary of the invention as defined in the appended claims.

What is claimed is:

1. A process for the production of a photostable anthocyanic colorant composition comprising combining an anthocyanic pigment and a photoprotective agent selected from the group consisting of sulfonated polyhydroxyflavonols, poly(hydroxyalkyl)flavonols, sulfonated polyhydroxyflavones, sulfonated polyhydroxyiso-flavones, and sulfonated aurones, the molar ratio of said photoprotective agent to said anthocyanic pigment being not less than 1:1.

2. The process as set forth in claim 1 wherein said photoprotective agent is selected from the group consisting of hydroxyethylrutin, apigenin sulfonate, biochanin A sulfonate, quercetin-5'-sulfonate, quercetin disulfonate, morin disulfonate, and 4'-methoxyaurone mono- and di-sulfonate.

3. The process as set forth in claim 2 wherein said anthocyanic pigment is selected from the group consisting of cyanidin rutinoside, grapeskin colorants and apigeninidin chloride.

4. The process as set forth in claim 2 wherein the photoprotective agent is selected from the group consisting of hydroxyethylrutin, quercetin-5'-sulfonate, quercetin disulfonate and morin disulfonate.

5. The process as set forth in claim 4 wherein the photoprotective agent is hydroxyethylrutin or quercetin-5'-sulfonate.

6. The process as set forth in claim 5 additionally comprising adding an acidulant such that addition of water to said composition will result in a solution pH of not greater than 4.

7. The process as set forth in claim 6 wherein said acidulant is citric acid or phosphoric acid.

8. The process as set forth in claim 7 wherein said anthocyanic pigment is cyanidin rutinoside and wherein said photoprotective agent is hydroxyethylrutin.

9. The process as set forth in claim 8 wherein the molar ratio of said hydroxyethylrutin to said cyanidin rutinoside is not less than five to one.

10. A photostable anthocyanic colorant composition consisting essentially of an anthocyanic pigment in combination with a photoprotective agent selected from the group consisting of sulfonated polyhydroxyflavonols, poly(hydroxyalkyl)flavonols, sulfonated polyhydroxyflavones, sulfonated polyhydroxyiso-flavones and sulfonated aurones said photoprotective agent being present in a molar concentration at least as great as the molar concentration of said anthocyanic pigment.

11. The composition as set forth in claim 10 wherein said photoprotective agent is selected from the group consisting of hydroxyethylrutin, apigenin sulfonate, biochanin A sulfonate, quercetin-5'-sulfonate, quercetin disulfonate, morin disulfonate, and 4'-methoxyaurone mono- and disulfonate.

12. The composition as set forth in claim 11 wherein said anthocyanic pigment is selected from the group consisting of cyanidin rutinoside, grapeskin colorant and apigeninidin chloride.

13. The composition as set forth in claim 11 wherein the photoprotective agent is selected from the group consisting of hydroxyethylrutin, quercetin-5'-sulfonate, quercetin disulfonate and morin disulfonate.

14. The composition as set forth in claim 13 wherein the photoprotective agent is hydroxyethylrutin or quercetin-5'-sulfonate.

15. The composition as set forth in claim 14 additionally containing an acidulant.

16. The composition as set forth in claim 15 wherein said acidulant is citric acid or phosphoric acid.

17. The composition as set forth in claim 16 wherein said anthocyanic pigment is cyanidin rutinoside and said photoprotective agent is hydroxyethylrutin.

18. The composition as set forth in claim 17 wherein the molar ratio of said hydroxyethylrutin to said cyanidin rutinoside is five to one.

19. The composition as set forth in claim 16 wherein said photoprotective agent is quercetin-5'-sulfonate.

20. The composition as set forth in claim 10 wherein said photoprotective agent is a poly(hydroxyalkyl)flavonol and said anthocyanic pigment is a 3-deoxyanthocyanidin.

21. The composition as set forth in claim 20 wherein said poly(hydroxyalkyl)flavonol is hydroxyethylrutin and said 3-deoxyanthocyanidin is apigeninidin chloride.

22. A food composition consisting essentially of a food base, an anthocyanic pigment and a photoprotective agent selected from the group consisting of poly(hydroxyalkyl)flavonols, sulfonated polyhydroxyflavones, sulfonated polyhydroxyisoflavones, sulfonated polyhydroxyflavonols, and sulfonated aurones.

23. The food composition as set forth in claim 22 wherein the food composition is a substantially dry powder.

24. The food composition as set forth in claim 22 wherein the food composition is a beverage syrup or concentrate.

25. The food composition as set forth in claim 22 wherein said food composition is a single strength beverage.

26. The food composition as set forth in claim 22 wherein said photoprotective agent is selected from the group consisting of hydroxyethylrutin, apigenin sulfonate, biochanin A sulfonate, quercetin-5'-sulfonate, quercetin disulfonate, morin disulfonate, and 4'-methoxyaurone mono- and di-sulfonate.

27. The food composition as set forth in claim 26 additionally comprising an acidulant selected from the group consisting of citric acid and phosphoric acid.

* * * * *